(12) United States Patent
Hiraishi et al.

(10) Patent No.: US 6,448,529 B1
(45) Date of Patent: Sep. 10, 2002

(54) ELECTRO DISCHARGE MACHINING APPARATUS

(75) Inventors: Masakazu Hiraishi, Osaka; Takeshi Masaki, Hirakata, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/592,729

(22) Filed: Jun. 13, 2000

(30) Foreign Application Priority Data

Jun. 16, 1999 (JP) .......................................... 11-169305
Jun. 18, 1999 (JP) .......................................... 11-171899

(51) Int. Cl.[7] ............................................. B23H 7/28
(52) U.S. Cl. ................................... 219/69.16; 219/69.17
(58) Field of Search ............................. 219/69.17, 69.16, 219/69.2

(56) References Cited

U.S. PATENT DOCUMENTS 3,916,138 A * 10/1975 Pfau ........................ 219/69.13
3,927,293 A * 12/1975 Bell, Jr. .................... 219/69.13
5,051,554 A * 9/1991 Tsukamoto ............... 219/69.16
5,064,985 A * 11/1991 Yoshizawa et al. ....... 219/69.16
5,589,086 A * 12/1996 Sawada et al. ........... 219/69.16
5,951,884 A * 9/1999 Futamura ................... 219/69.2
6,230,070 B1 * 5/2001 Yodoshi ..................... 700/162

FOREIGN PATENT DOCUMENTS

JP       2-89588 A   *  3/1990
JP        6-8051 A   *  1/1994
JP    10-283007 A   * 10/1998

* cited by examiner

*Primary Examiner*—Geoffrey S. Evans
(74) *Attorney, Agent, or Firm*—Greenblum & Bernstein, P.L.C.

(57) ABSTRACT

A workpiece 7 is held on a table and moved in X and Y directions relative to a tool electrode 4, which is displaceable in a direction orthogonal to the X and Y directions. The position of the workpiece 7 to which it should be moved is calculated based on the current positional data of the tool electrode 4 relative to the workpiece 7 and the machining data. The workpiece 7 is moved continuously in X and Y directions to the thus obtained position in accordance with the shape being machined.

11 Claims, 7 Drawing Sheets

POSITION OF TOOL ELECTRODE $t_0$ TIME $t_1$

POSITION OF X-DIRECTION MOVING STAGE $t_0$ TIME $t_1$

POSITION OF Y-DIRECTION MOVING STAGE $t_0$ TIME $t_1$

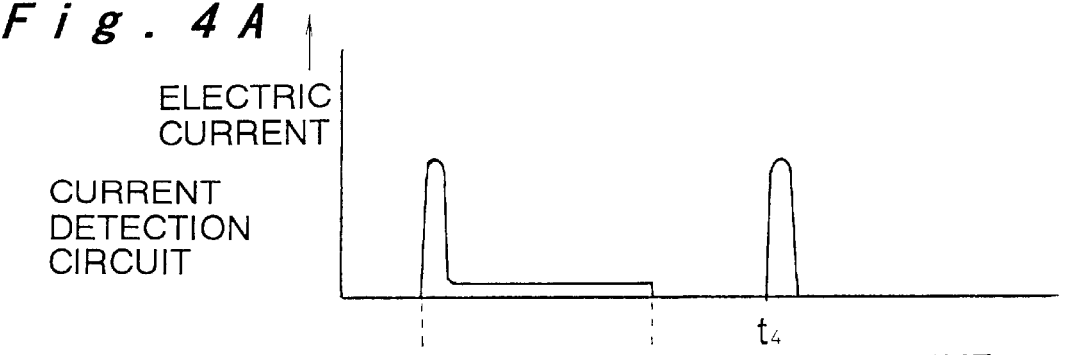
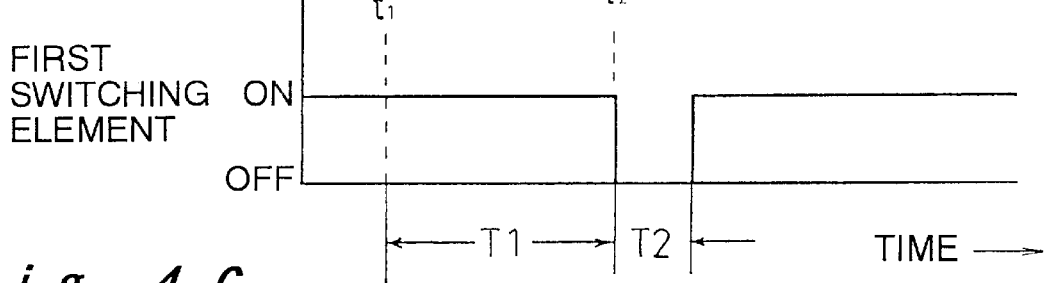
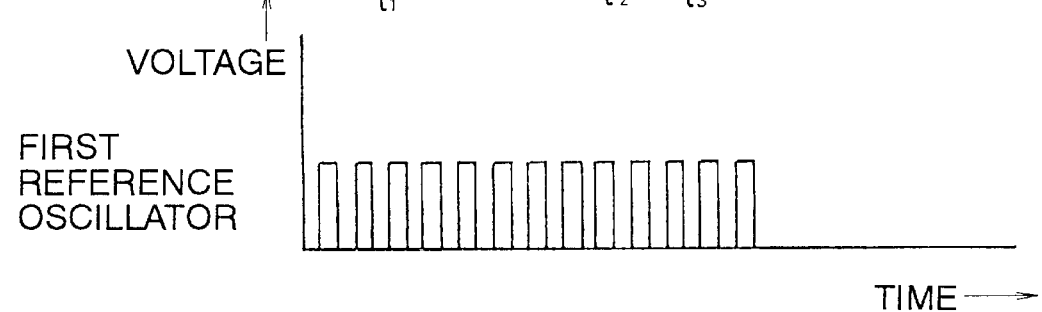

ELECTRO DISCHARGE MACHINING APPARATUS

BACKGROUND OF THE INVENTION

1. Technical Field of the Invention

The present invention relates to an electro discharge (or electric discharge) machining apparatus used for a micromachining process, for example, in the formation of micro holes or slits, by utilizing electro discharge generated (or electric discharge) generated in a micro-discharge gap between a tool electrode and a workpiece.

2. Description of Related Art

Micro-electro discharge machining techniques have been used mainly for drilling micro holes for e.g. the nozzles of an inkjet printer. In response to the demands in recent years, ultra-micro electro discharge machining apparatuses capable of drilling holes of as small as 5 μm in diameter have been developed. Such apparatus has an overall construction as shown in FIG. 7. Micro-electro discharge machining apparatus of such kind comprises a machining head 1 that is equipped with a tool electrode 4 and moved up and down, a positioning mechanism 2 which controls the movement of a workpiece 7 and positions same with respect to the tool electrode 4, and a control unit 3 including a discharge circuit 5.

The machining head 1 comprises a mandrel 8, and the tool electrode 4 is mounted to a lower end of the mandrel 8 so as to extend vertically downwards. The tool electrode 4 is driven to rotate by a rotation drive power source (not shown) such as a D/C motor, and is fed precisely in the machining direction, i.e., vertically downwards, by means of a ball screw (not shown) that is rotated by a motor 9. The tool electrode 4 is rotated around its axis for the purpose of removing chips produced by machining and achieving true roundness of the tool electrode.

The positioning mechanism 2 comprises a tank 11 filled with dielectric 10 composed of an insulating fluid such as pure water, a table 12 disposed inside of the tank 11, an X-Y stage 13 for moving the tank 11 fixedly placed thereon in an X-direction and a Y-direction, that are orthogonal to each other in a horizontal plane, and a stage drive mechanism 14 for controlling the movement of this X-Y stage 13. The workpiece 7 is fixedly arranged on the table 12 in the dielectric 10, so that part thereof to be machined is positioned relative to the tool electrode 4 by means of the X-Y stage 13 driven and controlled by the stage drive mechanism 14.

The discharge circuit 5 in the control unit 3 comprises a capacitor 15 connected between the tool electrode 4 and the workpiece 7, and a resistor 16 and a power source 6 that are serially connected to each other but connected in parallel with respect to the capacitor 15. In this discharge circuit 5, a cycle is repeated wherein electric charges are charged at the capacitor 15 by applying voltage from the power source 6 through the resistor 16, and discharged when the tool electrode 4 is fed forward by the machining head 1 to a predetermined position in close proximity to the workpiece 7 with a small gap between the two and dielectric breakdown occurs.

Further, although not shown, the control unit 3 includes a CPU, and drive control units and the like for controlling the stage drive mechanism 14, as well as controlling the rotation of the motor 9, for moving the machining head 1 precisely.

Drilling of micro holes is accomplished by utilizing this electro discharge that is brought about when the tool electrode 4 is approached to the workpiece 7 with a certain gap therebetween by the downward movement of the machining head 1, in a state that voltage is applied from the discharge circuit 5 across the tool electrode 4 and the workpiece 7 via the dielectric 10. Machining proceeds as the workpiece 7 is melted by the heat accompanying the intermittent electro discharge between the tool electrode 4 and the workpiece 7, while dust or chips that are subsequently produced are removed. Thus, marks formed in the workpiece by the electro discharge eventually develops into a hole.

Electronic discharge machining apparatus of this type has various characteristic features as described below. Firstly, micro-machining is possible, by the minimization of discharge energy and by the miniaturization of the tool electrode 4. Workpiece 7 of any kind of material can be machined as long as it is conductive, and even materials having high hardness can be machined with ease. Further, materials having high specific resistance such as silicon or ferrite, which are susceptible to cracking in a normal EDM process, can also be machined. Secondly, since it is non-contact machining process, machining is performed to the workpiece 7 without subjecting it to a machining force. Moreover, machining can be performed highly precisely with respect to a curved surface, inclined surface, or a thin plate, which can hardly be achieved by a conventional drilling method. Furthermore, machining of a hole with a depth ten times greater than the diameter of the hole is possible, as long as the diameter is more than 50μm, and thus it can favorably be applied to the machining of a mold for use in plastic processing such as punching of micro components.

In the EDM apparatus as described above, machining of a shape is achieved in such a way that the configuration of the tool electrode is transferred to the workpiece. Thus in the case of a cylindrical tool electrode, as the machining proceeds, a hole matching the shape of the tool electrode 4 is drilled. Accordingly, for machining a shape that is different from the distal end surface configuration of the tool electrode, the position of the workpiece 7 relative to the tool electrode 4 is changed in succession corresponding to the desired shape, by controlling the movement of the X-Y stage 13 driven by the stage drive mechanism 14, and by repeating each time the discharge machining.

For example, in the case of forming a tapered hole of which cross section reduces gradually toward the bottom, a hole having a cross section matching the cross section of the distal end surface of the tool electrode 4 is first drilled. Machining is then performed with respect to this hole, so that the hole will be tapered, with the diameter being maximum at the upper end. In order to widen the diameter of the hole that is already formed, the workpiece 7 is positioned relative to the tool electrode 4 so that the tool electrode 4 faces a position at the periphery of the hole, and the electro discharge machining is started from this point. The tool electrode is moved downward, while relative positions of the workpiece 7 and the tool electrode 4 are gradually changed such that, the portion being machined by the tool electrode is moved in succession toward the inner side of the hole. This process of machining from the upper edge of the hole down to the bottom is repeated until the tool electrode 4 has made one round of the hole, whereby a tapered hole having a largest diameter at the upper edge is machined.

In a conventional EDM apparatus, in cases where a large-size shape different from the configuration of the distal end surface of the tool electrode 4 is machined as described above, because electro discharge machining must be repeatedly performed as the position of the workpiece 7 relative to the tool electrode 4 is changed in succession in accordance with the machining shape, it takes considerable time for machining the entire shape. In addition, because electro discharge machining is started every time the position of the workpiece 7 relative to the tool electrode 4 is changed, there is the problem that machined surface roughness is deteriorated because, for example, precise roundness could not be achieved, or because marks are created on the machined surface in a stepped fashion, or because of generation of machining dust or burrs accompanied by excessive discharge.

The machining surface roughness of the workpiece 7 is also deteriorated when abnormal electro discharge occurs in the EDM apparatus described above. In the event of abnormal discharge, not only charging and discharging are repeated at the capacitor 15 in vain, and also, electric current flows out from the power source 6 through the resistor 16 across the short-circuited tool electrode 4 and the workpiece 7, which causes energy loss, and deteriorates the machining surface roughness.

To deal with such situation caused by abnormal electro discharge, measures are taken to cause the tool electrode 4 to retract from the workpiece 7 by a distance long enough to restore the electrically insulated state upon detecting short circuit between the tool electrode 4 and workpiece 7 based on the fact that the machined amount is less than a predetermined level. In this way, in the event of abnormal electro discharge, the operation time is protracted owing to the procedures for restoration to the normal state.

Moreover, in the conventional EDM apparatus, the peak current and discharge time during charging/discharging at the capacitor 15 are defined fixedly by the capacity of the capacitor 15 and the resistance of the resistor 16, because of which flexible control of discharge corresponding to the material of workpiece or various types of machining modes cannot be effected.

A further problem in the prior art is that, as the machining of a shape that is different from the shape of the tool electrode proceeds, the dielectric stagnates in the drilled hole in the workpiece, which leads to electrolysis between the workpiece and tool electrode via the dielectric. This happens particularly when ultra pure water is employed for the dielectric, and as the machining is performed for a prolonged period of time, the workpiece and the tool electrode are caused to be conducting, whereupon the electro discharge efficiency decreases, and precise machining of a desired shape can hardly be accomplished.

SUMMARY OF THE INVENTION

In view of the foregoing, an object of the present invention is to provide an electro discharge machining apparatus that is capable of machining a workpiece with improved surface roughness and in a reduced operation time.

To accomplish the above object, the present invention provides an electro discharge machining apparatus comprising:

a table for holding thereon a workpiece within dielectric;

an X-direction moving stage and a Y-direction moving stage for moving the table to a given position in X and Y directions that are orthogonal to each other on an identical plane;

a tool electrode arranged displaceable in a machining direction that is orthogonal to both of the X and Y directions for bringing about electro discharge between itself and the workpiece when brought to a position in close proximity to the workpiece;

a position detecting element for detecting a current position of the tool electrode in relation to the workpiece;

an operation circuit for calculating a next position to which the workpiece should be moved based on data regarding the current position of the tool electrode in relation to the workpiece obtained from the position detecting element, and predetermined machining data that are registered beforehand; and a drive control unit for controlling movement of the X-direction moving stage and the Y-direction moving stage based on operation results of the operation circuit, wherein the workpiece is automatically and continuously moved to a next position in the X and Y directions corresponding to the current position of the tool electrode in accordance with a machining shape.

The present invention also provides an electro discharge machining apparatus comprising:

a table for holding thereon a workpiece within dielectric;

a tool electrode for bringing about electro discharge between itself and the workpiece when brought to a position in close proximity to the workpiece;

an electrode drive mechanism for forwarding the tool electrode toward the workpiece;

a control unit for effecting control of the electro discharge brought about between the tool electrode and the workpiece, and for controlling the electrode drive mechanism, wherein the control unit comprises:

a discharge circuit for supplying current for discharge by discharging electric charges charged at a capacitor by a power source device through a resistor;

a current detecting element for detecting a discharge current and outputting a discharge current detection signal;

a discharge control circuit which detects occurrence of abnormal discharge based on a predetermined condition in which the discharge current detection signal is input, and shuts off power supply from the power source device.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 4A is a wave form chart of discharge current that flows in a current detection circuit in the control unit of the EDM apparatus, FIG. 4B is a diagram showing the timing of energizing a first switching element in the control unit, and FIG. 4C is a wave form chart of oscillation signal in a first reference oscillator in the control unit;

DESCRIPTION OF PREFERRED EMBODIMENTS

Preferred embodiments of the present invention will be hereinafter described with reference to the accompanying drawings.

Figure 1:
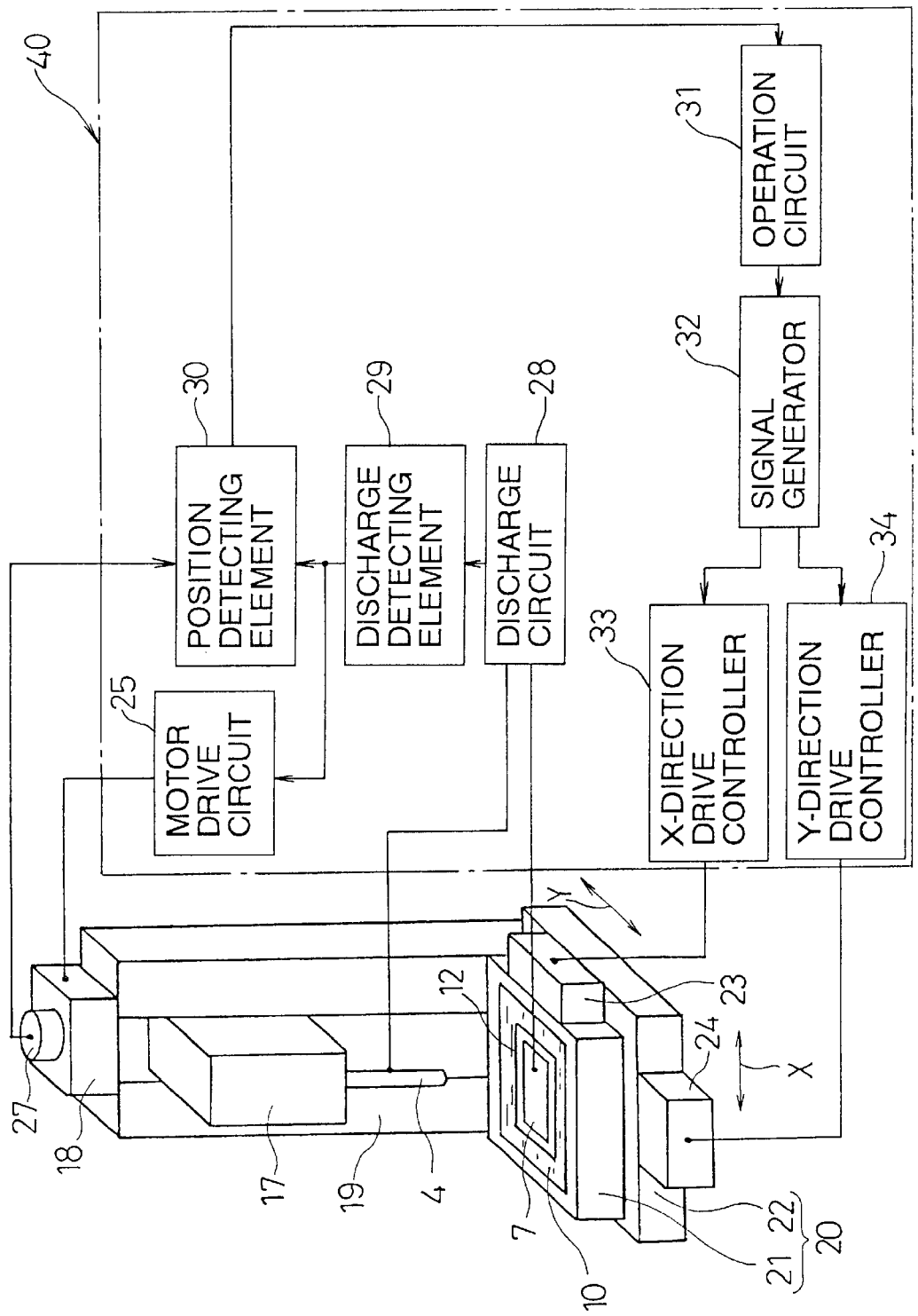
FIG. 1 is a diagram schematically showing the construction of an electro discharge machining (EDM) apparatus according to one embodiment of the present invention.
Figure 7:
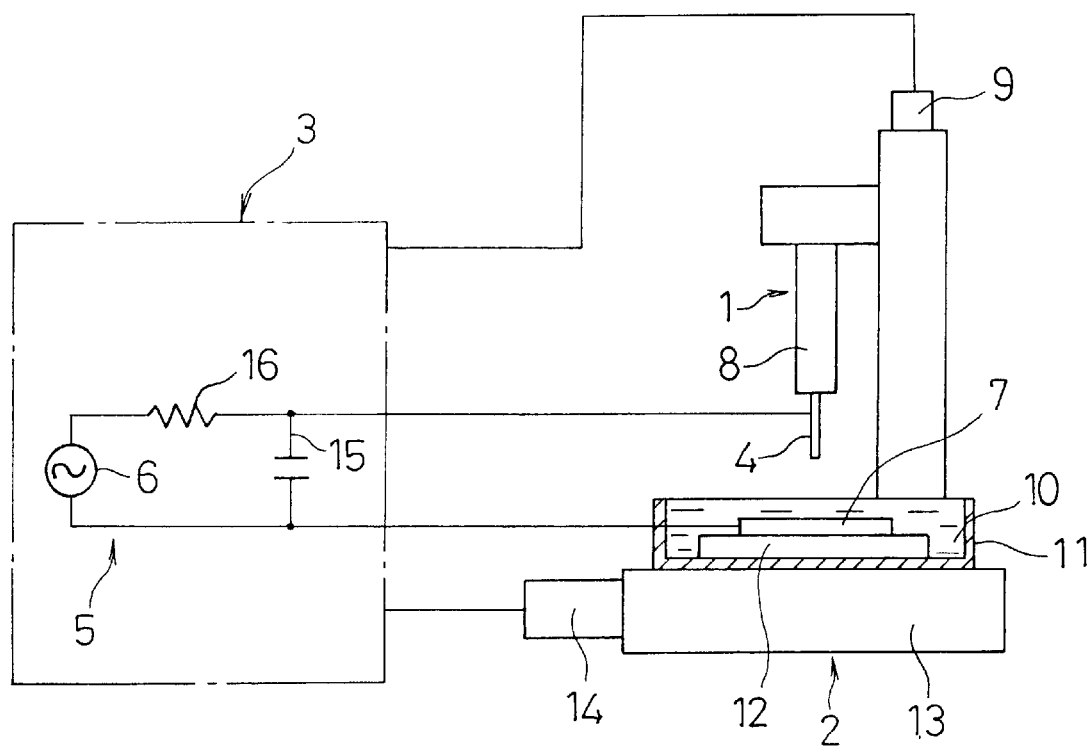
FIG. 7 is a diagram schematically showing the construction of a conventional EDM apparatus.

FIG. 1 is a diagram schematically showing the construction of an electro discharge machining (EDM) apparatus according to one embodiment of the present invention. Same or equivalent elements as those shown in FIG. 7 are given the same reference numerals. The EDM apparatus comprises a machining head 17 which supports the tool electrode 4 such that it is freely rotatable, and is moved up and down, guided by a guide mechanism 19, on a ball screw (not shown) which is driven by a motor 18 as an upward/downward drive power source, so that the tool electrode 4 is fed vertically downwards with high precision.

The workpiece 7 placed and held on the table 12 within the dielectric 10 is moved in the X and Y directions that are orthogonal to each other on the same, in this case, horizontal plane, by the X-Y stage 20, and is positioned with respect to the tool electrode 4. The X-Y stage 20 comprises an X-direction moving stage 21 for moving the table 12 in the X direction and a Y-direction moving stage 22 for moving the table 12 in the Y direction. The X-direction moving stage 21 is mounted on top of the Y-direction moving stage 22 and controlled to move in the X direction by means of an X-direction drive mechanism 23 comprising a piezoelectric actuator which is constructed with highly precise vibration elements such as piezoelectric elements (not shown). The Y-direction moving stage 22 is controlled to move in the Y direction together with the X-direction moving stage 21 thereon by a Y-direction drive mechanism 24, comprising a piezoelectric actuator which is similarly constructed with piezoelectric elements.

The rotation of the motor 18 for providing power source for upward and downward movements of the tool electrode 4 is controlled via a motor drive circuit 25. A rotation detecting element 27 consisting of encoder or the like detects the rotation of the motor 18 and outputs a rotation detection signal to a position detecting element 30. Discharge voltage is applied in a predetermined pulse form across the tool electrode 4 and the workpiece 7 by a discharge circuit 28 for bringing about electro discharge intermittently, and by making a multiplicity of discharge marks formed by the electro discharge, a hole, for example, is formed in the workpiece 7. A discharge detecting element 29 detects the presence of electro discharge between the tool electrode 4 and the workpiece 7 based on changes in voltage in the discharge circuit 28. The position detecting element 30 calculates the relative positions of the tool electrode 4 and the workpiece 7 from the time point when a discharge detection signal is input from the discharge detecting element 29, based on the rotation detection signal input from the rotation detecting element 27 that detects the rotation of the motor 18. The obtained positional data is output to an operation circuit 31 as an electric signal such as voltage. Meanwhile, when the discharge detection signal is input from the discharge detecting element 29, the motor drive circuit 25 switches over the rotation of the motor to a mode in which the rotation of the motor is controlled to remain at a predetermined speed.

The operation circuit 31 calculates positions in the X and Y directions to which the workpiece 7 should be moved from where they are now that is known by the positional data obtained from the position detecting element 30, in accordance with the machining data for machining a predetermined shape that is preset. The obtained data regarding positions in the X and Y directions to which the workpiece 7 should be moved is output to a signal generator 32. The signal generator 32 generates signals indicating X-direction movement amount and Y-direction movement amount corresponding to the input operation results of positional data in the X and Y directions, and outputs these signals separately to an X-direction drive controller 33 and a Y-direction drive controller.

The X-direction drive controller 33 and Y-direction drive controller 34 respectively have amplitude modulation circuits therein, and control the respective piezoelectric elements of the X-direction drive mechanism 23 and Y-direction drive mechanism 24 in accordance with the signals indicative of movement amounts in X and Y directions input from the signal generator 32. Thereby, the position of the workpiece 7 relative to the tool electrode 4 is successively changed in conformity to the intended machining shape. Although not shown in FIG. 1 but as it is well known, there is further provided an X-Y table for positioning the X-Y stage 20 at certain locations in X and Y directions that are orthogonal to each other.

Referring to FIG. 2, one example of operation of the EDM apparatus will be described. In this example, a tapered hole is machined in the workpiece 7, using a thin, cylindrical tool electrode having a circular cross-section. When the workpiece 7 is set on the table 12, the X-Y stage 20 is moved upon receiving an instruction from a controller (not shown) so that a portion of the workpiece 7 where the tapered hole is to be machined is positioned immediately below the tool electrode.

The controller then instructs the motor drive circuit 25 to activate the motor 18, upon which the tool electrode starts descending towards the vicinity of the workpiece 7. At this time, voltage in a predetermined amount is applied across the tool electrode 4 and the workpiece 7 by the discharge circuit 28. Accordingly, when the distance between the tool electrode 4 and workpiece 7 is reduced to a predetermined level at $t_0$ in FIG. 2A, insulation of the dielectric 10 breaks down and arc discharge is brought about following spark discharge. At this point, pulse discharge current is supplied from the discharge circuit 28, and therefore, the arc discharge disappears in a short period of time. However, the portion at which the electro discharge has occurred melts or vaporizes because of the heat generated thereby, leaving a crater. Arc discharge occurs on the surface opposite the tool electrode and spreads in succession, resulting in the formation of a crater in the workpiece 7 that is in conformity to the entire area of the end surface configuration of the tool electrode 4. Therefore, the distance between the tool electrode and workpiece remains uniform as the machining proceeds.

The discharge detecting element 29 detects the generation of the arc discharge based upon changes in the voltage in the discharge circuit 28, and outputs a discharge detection signal to the position detecting element 30 and the motor drive circuit 25, respectively. The motor drive circuit 25, upon receiving the discharge detection signal, starts control of the rotation of the motor 18 such as to cause the tool electrode 4 to proceed forwards to the workpiece 7 at a predetermined speed. Accordingly, the positional relation between the tool electrode 4 and workpiece 7 remains the same with a minute gap always being present therebetween, so that electro discharge is maintained. In this state, the tool electrode 4 is moved downwards at the predetermined speed in the drilling direction into the workpiece 7 as the machining proceeds.

Meanwhile, from the time point when the discharge detection signal is input from the discharge detecting element 29, the position detecting element 30 performs operations based on the rotation detection signal input from the rotation detecting element 27 to calculate the relative positions of the tool electrode 4 and the workpiece 7. The resultant positional data are output as electric signal such as voltage to the operation circuit 31. The operation circuit 31 calculates the positions to which the workpiece 7 should be moved in the X and Y directions based on the present position of the tool electrode 4 detected by the rotation detecting element 27 and the machining data that is registered beforehand, and outputs the obtained information on movement amounts in the X and Y directions to the signal generator 32. The signal generator 32 generates signals representative of the movement amount in the X direction and the movement amount in the Y direction respectively, corresponding to the data input from the operation circuit 31, and outputs the signals separately to the X-direction drive controller 33 and the Y-direction drive controller 34.

Figure 2A:
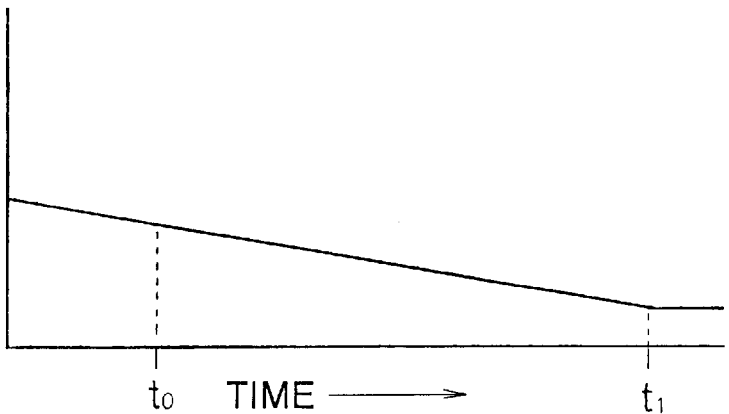
FIGS. 2A–2C are graphs indicating the positions of the tool electrode, X-direction stage, and Y-direction stage, in the EDM apparatus of FIG. 1.
Figure 2B:
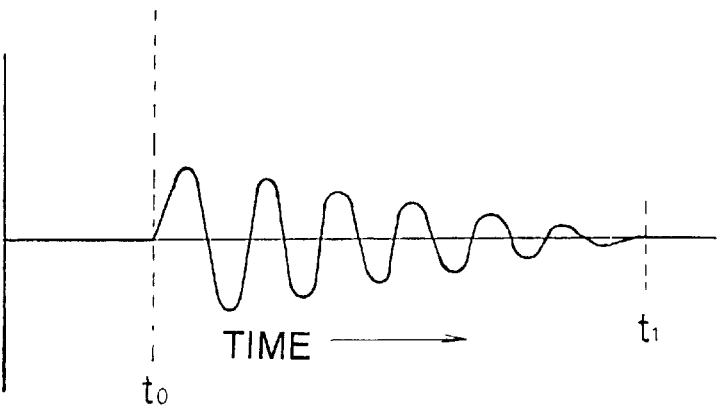
Figure 2C:
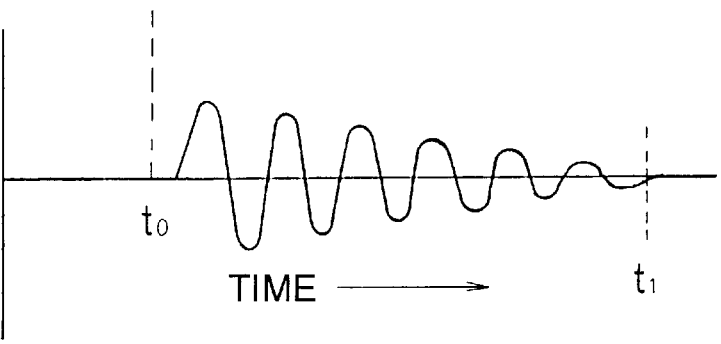

The X-direction drive controller 33 and the Y-direction drive controller 34 respectively effect control of the respective piezoelectric elements of the X-direction moving stage 21 and Y-direction moving stage 22 in accordance with the input signals representative of the movement amount in the X direction and the movement amount in the Y direction, as shown in FIG. 2B and FIG. 2C. As clear from a comparison of FIGS. 2B and 2C, the piezoelectric elements are respectively driven so that the positions of the X-direction moving stage 21 and Y-direction moving stage 22 will change in sine wave forms with 90 degrees phase shift and the amplitude being gradually reduced. Accordingly, a circular motion is imparted to the workpiece 7 by driving respective piezoelectric elements of the X-direction moving stage 21 and Y-direction moving stage 22 as described above in synchronism with the forward movement of the tool electrode 4 toward into the hole, and as the circular motion goes on, the diameter of the circular movement track reduces gradually. A tapered hole can thereby be machined in the workpiece 7 by continuous movement of the tool electrode 4 in a short period of time without any step-like marks on the machining surface. Moreover, as the machining is performed continuously, dust or chips created by machining can be efficiently removed. The workpiece can therefore be machined with favorable results without any burrs or the like and without any possibility of excessive discharge.

When the machining of the tapered hole is completed at $t_1$ in FIG. 2A, electro discharge is stopped, whereupon the motor drive circuit determines that the operation has been completed based on the fact that the discharge detecting element 29 has stopped outputting the discharge detection signal. At the same time, as the position detecting element 30 stops outputting positional data to the operation circuit 31, the X- and Y-direction drive controllers 33, 34 stop driving the X- and Y-direction moving stages 21, 22.

Figure 3:
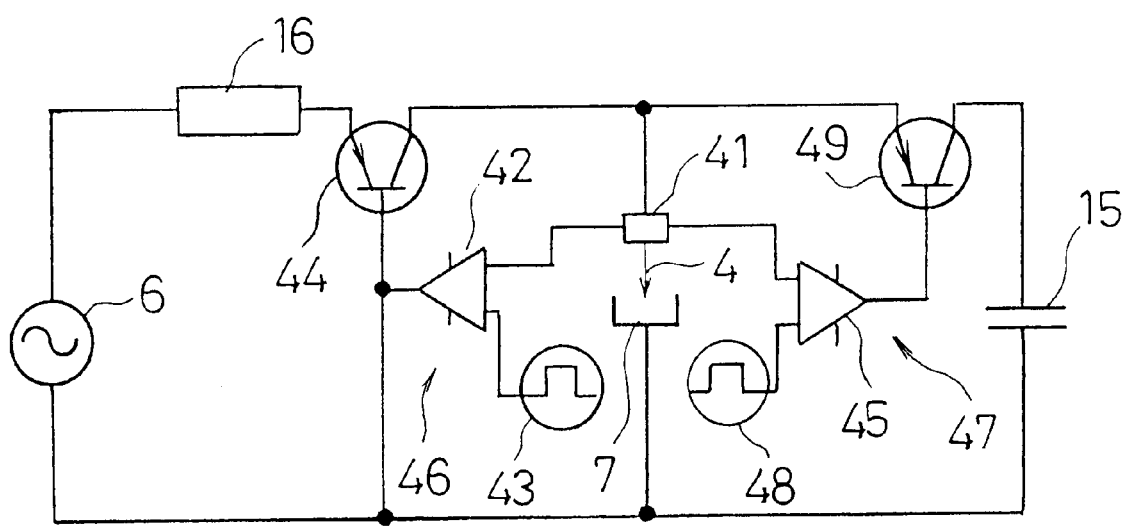
FIG. 3 is an electric wiring diagram in the control unit of the EDM apparatus.

Next, the electric control system of the EDM apparatus will be described in more detail. FIG. 3 is an electric wiring diagram illustrating the construction of the electric control system in the control unit 40 together with the tool electrode 4 and the workpiece 7. The mechanical control systems for controlling the motor 18, stage drive mechanism, and the like in the control unit 40 are not illustrated in the drawing. Further, the elements identical to those shown in FIG. 1 or FIG. 7 are given the same reference numerals. Similarly to the discharge circuit of the conventional EDM apparatus described with reference to FIG. 7, the discharge circuit comprises the power source 6, resistor 16, capacitor 15, and functions such that electric charges that are charged at the capacitor 15 through the resistor 16 are discharged when the tool electrode 4 comes to close vicinity of the workpiece 7. The electric control system further comprises a current detecting circuit 41 which detects discharge current across the tool electrode 4 and workpiece 7 and outputs a discharge current detection signal, a discharge control circuit 46 which shuts current supply from the power source 6 upon detecting abnormal discharge based on the input discharge current detection signal, and a discharge current control circuit 47 for controlling discharge current from the capacitor 15.

The discharge control circuit 46 comprises a first switching element 44 such as an FET or BJT connected in the power supply circuit for the power supply from the power source 6 to the capacitor 15, a first reference oscillator 43 for outputting clock signals, and a first operation control circuit 42, which starts timekeeping operation based on the clock signals from the first reference oscillator 43 from a point in time when a discharge current detection signal is input from the current detecting circuit 41. This timekeeping operation goes on as long as the discharge current detection signal is continuously input, and after a predetermined abnormality-detection time period has passed, the first operation control circuit 42 turns off the first switching element 44 for a predetermined time period for restoring to normal. The operation of the first operation control circuit 42 will be described later in further detail.

The discharge current control circuit 47 comprises a second switching element 49 such as an FET or BJT connected in the discharge circuit of the capacitor 15, a second reference oscillator 48 for outputting clock signals, and a second operation control circuit 45, which starts timekeeping operation based on the clock signals from the second reference oscillator 48 from a point in time when a discharge current detection signal is input from the current detecting circuit 41. After a predetermined pulse-width time period has passed, the second operation control circuit 45 turns off the second switching element 49 for a predetermined pulse-separation time period. The operation of the second operation control circuit 45 will be described later in further detail.

Referring to FIGS. 4A–4C, when discharge occurs at $t_1$, the current detecting circuit 41 detects discharge current in the waveform as shown in FIG. 4A, and outputs at the same time a discharge current detection signal to the first operation control circuit 42. From the time point when the discharge current detection signal is input, the first operation control circuit 42 starts to count the clock signals shown in FIG. 4C output from the first reference oscillator 43 for counting a time period during which the discharge current detection signal is continuously input. When the first operation control circuit 42 has kept counting the time period during which the discharge current detection signal is continuously input until a time point $t_2$ at which a predetermined abnormality-detection time period T1 has passed from the time point $t_1$ of the start of timekeeping operation, it is determined that an abnormal discharge has occurred, whereupon the first switching element 44 is turned off at $t_2$ as shown in FIG. 4B. While the first reference oscillator 43 outputs signals constantly, the first operation control circuit 42 refers to the clock signals from the first reference oscillator 43 only when counting time as shown in FIG. 4C.

When the first switching element 44 is turned off, the charging current from the power source 6 through the resistor 16 stops flowing to the capacitor 15, and also, the current from the power source 6 through the resistor 16 that flows across the tool electrode 4 and the workpiece 7 is forcibly shut off. Thus abnormal discharge is forcibly stopped immediately after the switching element 44 is turned off. Accordingly, the capacitor 15 is prevented from being charged and discharged repeatedly in the event of continuous abnormal discharge. Current waste, caused by endless current flow across the tool electrode 4 and the workpiece 7, is prevented, thereby avoiding energy loss and deterioration in the surface roughness of the machined workpiece 7. Moreover, the machining operation time is prevented from being protracted owing to continuous abnormal discharge.

After turning off the first switching element 44 at $t_2$, the first operation control circuit 42 resets the count of time and restarts timekeeping operation based on the clock signals from the first reference oscillator 43. At the time point $t_3$, at which a predetermined restoration time period T2 has passed from $t_2$, the first operation control circuit 42 turns on the first switching element 44. The restoration time period T2 is set to be a time period required for the control unit 40 to cause the tool electrode 4 to move away from the workpiece 7 at a position where a suitable discharge gap is formed between the tool electrode and the machining surface of the workpiece 7. Therefore, at a time point $t_4$ shortly after $t_3$, discharge occurs again as shown in FIG. 4A. In this way, as soon as abnormal discharge occurs, it is forcibly stopped and the state of discharge is swiftly restored to normal. Unnecessary protraction of the operation time for machining is thereby reliably prevented.

The discharge which occurs at the time point $t_4$ is a normal discharge and disappears before the predetermined abnormality-detection time period T1 passes from $t_4$. Accordingly, the current detecting circuit 41 stops outputting the discharge current detection signal before the abnormality-detection time period T1 passes from $t_4$, so that the first switching element 44 is not turned off by the first operation control circuit 42, whereby normal discharge machining is further carried out.

In addition to forcibly stopping abnormal discharge and effecting restoration of discharge to normal, the first operation control circuit 42 controls charging current supplied to the capacitor 15 from the power source 6 by turning on and off the first switching element 44 in a predetermined cycle, thereby making variable the charging time of the capacitor 15. The number of discharge per unit time can thereby be varied arbitrarily. Accordingly, the charging current supplied to the capacitor 15 from the power source 6 can be variously changed and not fixedly determined by the capacitance of the capacitor 15 and the resistance of the resistor 16. The time for machining operation can be varied in accordance with the material of the workpiece and the mode of machining, and thereby discharge efficiency can be increased.

Figure 5A:
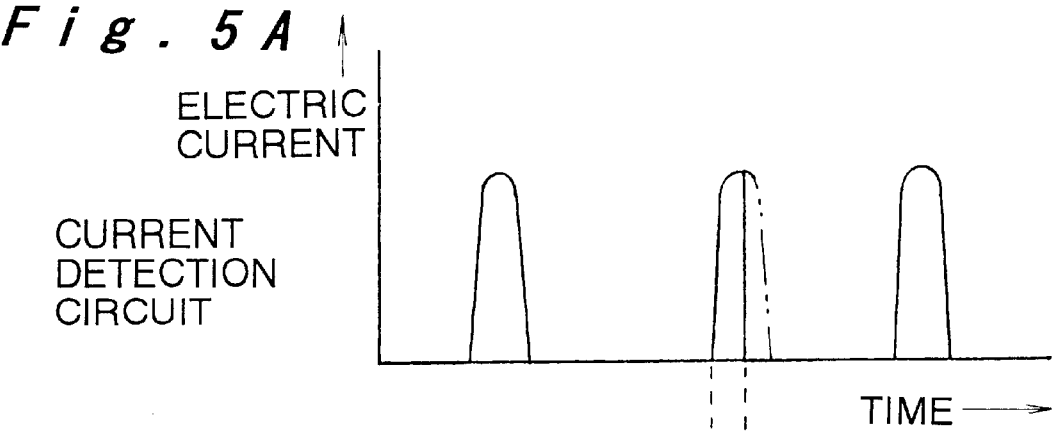
FIG. 5A is a wave form chart of discharge current that flows in a current detection circuit in the control unit of the EDM apparatus.
Figure 5B:
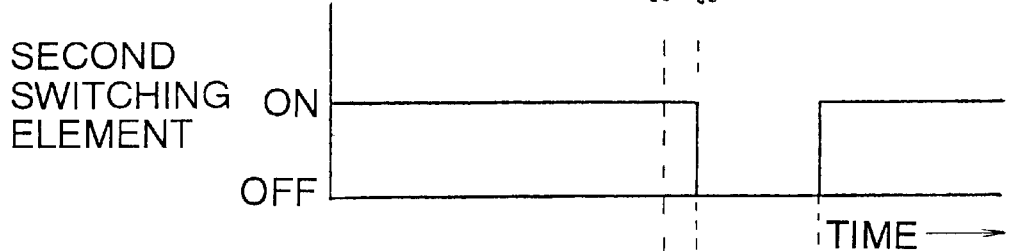
FIG. 5B is a diagram showing the timing of energizing a second switching element in the control unit.

Meanwhile, the second operation control circuit 45 in the discharge current control circuit 47 effects variable control of the pulse width of the intermittent discharge current of the capacitor 15. For example, as shown in FIG. 5A, when the current detecting circuit 41 detects a discharge current at the point in time $t_5$, it outputs a discharge current detection signal to the second operation control circuit 45. From the time point $t_5$ when the discharge current detection signal is input, the second operation control circuit 45 starts to count the clock signals shown in FIG. 5C output from the second reference oscillator 48. At the point in time $t_6$ at which a predetermined time period T3 corresponding to the pulse width of the discharge current as shown in FIG. 5A has passed, the second switching element 49 is turned off at $t_6$ as shown in FIG. 5B. Thereby, the discharge current by the discharge of the capacitor 15 is controlled in accordance with the pulse width of the predetermined pulse width time period T3.

Figure 5C:
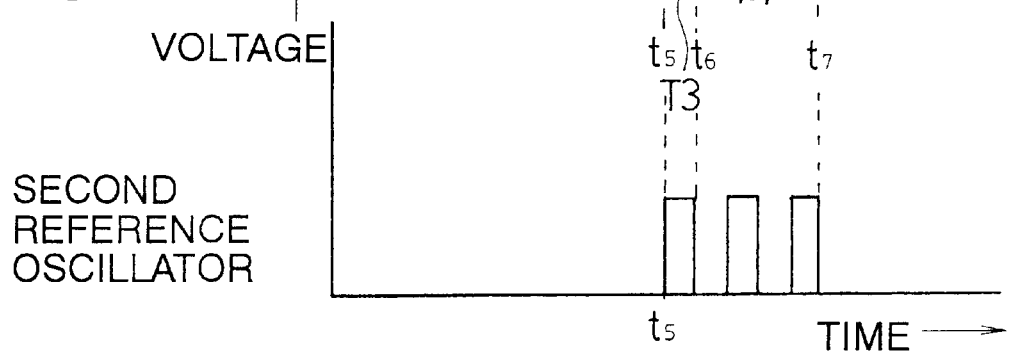
FIG. 5C is a wave form chart of oscillation signal in a second reference oscillator in the control unit.

After turning off the second switching element 49, the second operation control circuit 45 resets the count of time and restarts timekeeping, and turns on the second switching element 49 again at $t_7$ when a predetermined pulse separation time period T4 has passed. Thus, the capacitor 15 discharges immediately after $t_7$ and supplies discharge current across the tool electrode 4 and the workpiece 7. While the second reference oscillator 48 outputs clock signals constantly, the second operation control circuit 45 refers to the clock signals only when counting time as shown in FIG. 5C.

Accordingly, the pulse width of the discharge current by the discharge of the capacitor 15 can be variously set in accordance with the type of workpiece 7 and the shape to be machined, by varying the pulse width of the discharge current by setting a suitably selected pulse width time period T3. Electric charges charged at the capacitor 15 can be used in wider applications, and thereby machining precision can be enhanced and machining time can be reduced.

In addition to the variable control of the pulse width and pulse separation of the discharge current, the second operation control circuit 45 effects control such that discharge current is flown intermittently by turning on and off the second switching element 49 in a predetermined cycle. Thereby, the electric charges charged at the capacitor 15 can be used more effectively and the machining precision can be further enhanced.

Figure 6:
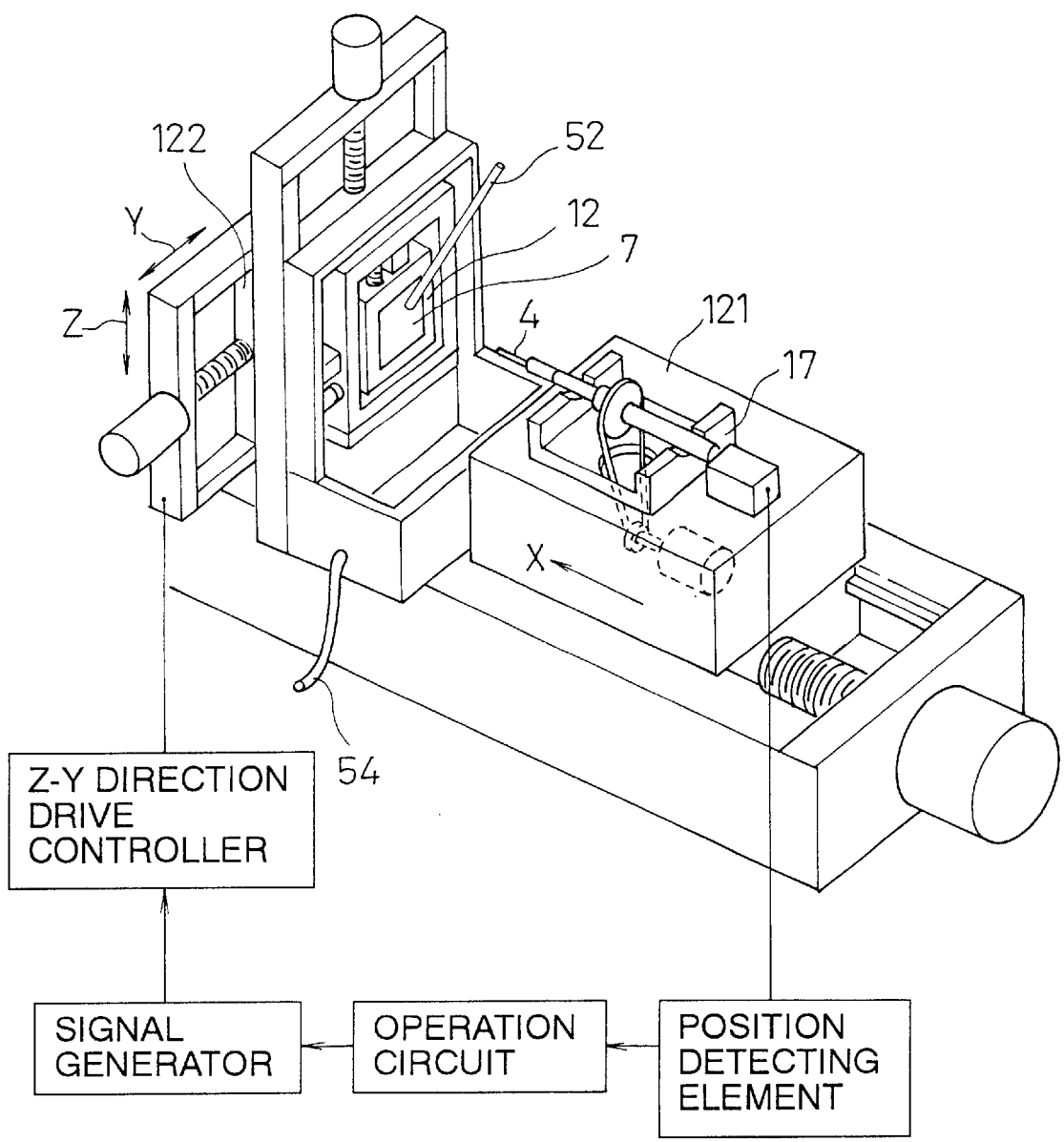
FIG. 6 is a schematic diagram of an electro discharge machining apparatus according to a second embodiment of the present invention.

Next, another embodiment of the present invention will be described with reference to FIG. 6. Same or equivalent elements as those shown in FIG. 1 are given the same reference numerals.

According to the EDM apparatus of this embodiment, the table 12 for holding thereon a workpiece 7 is held vertically on a moving stage which is movable in two directions orthogonal to each other on an identical plate, and the workpiece 7 is machined while running liquid of dielectric is continuously supplied thereto. In the example shown in FIG. 6, the table 12 is fixedly held on a Z-Y direction moving stage 122, while the tool electrode 4 is mounted on an X-direction moving stage 121 which is capable of moving in an X-direction that is orthogonal to the plane defined by the Z and Y directions. It is of course possible to modify the construction so that the table 12 is mounted on a moving stage which is movable in Z and X directions crossing at right angles with each other, while the tool electrode 4 is moved in a Y direction, that is orthogonal to both of the Z and X directions. Dielectric is continuously supplied by a nozzle 52 to the workpiece 7 on the table 12 in a flowing state, and is discharged from a drain pipe 54.

The operation of the EDM apparatus is controlled by a control unit (not shown) so that the workpiece 7 is positioned relative to the tool electrode 4 by moving the Z-Y direction moving stage 122 in two directions and the tool electrode 4 is proceeded towards the workpiece 7.

The Z-Y direction moving stage 122 comprises a piezoelectric actuator, for it requires positioning precision in sub microns and high responsiveness of more than 100 Hz. The Z-Y direction moving stage 122 makes a circular motion by the combination of the movements in two orthogonal directions. A current position of the tool electrode 4 is detected by any suitable position detecting element such as an encoder or the like. The data representative of the position of the tool electrode is converted to an electric signal such as voltage and input to the operation circuit.

The operation circuit calculates the amount of movement of the Z-Y direction moving stage 122 in two directions to move the workpiece 7 from where they are now that is known by the electric signal input from the position detecting element for the tool electrode 4, in accordance with the machining data that is registered beforehand for machining a predetermined shape. The obtained data regarding positions in the Z and Y directions to which the workpiece 7 should be moved is output to a signal generator. The signal generator generates signals indicating respective movement amounts in Z and Y directions corresponding to the input operation results of positional data in the two directions, and outputs these signals to the Z-Y direction drive controller.

The Z-Y direction drive controller has a signal converter such as an amplitude modulation circuit therein for altering the amplitude of vibration of the piezoelectric element in the Z-Y direction moving stage 122, by which the movements of the Z-Y direction moving stage 122 are controlled in accordance with the signals input from the signal generator. Thereby, the workpiece 7 and the tool electrode 4 can be continuously moved in synchronism with each other.

During all these movements of the workpiece 7, the dielectric such as pure water is continuously supplied at a constant flow rate from the nozzle 52, and successively drained through the pipe 54. Since the dielectric does not stay between the tool electrode 4 and the workpiece 7, no electrolysis occurs therebetween, and the insulation effect is maintained. Accordingly, the machining precision can be improved, and the operation time can be reduced.

Although not fully shown, it should be noted that the control unit of the EDM apparatus of the second embodiment is similarly constructed as that of the first embodiment shown in FIG. 1.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. An electric discharge machining apparatus comprising:
a table for holding thereon a workpiece within dielectric;
an X-direction moving stage and a Y-direction moving stage for moving the table to a given position in X and Y directions that are orthogonal to each other within a plane;
a tool electrode arranged to be displaceable in a machining direction that is orthogonal to both of the X and Y directions for performing electric discharge between the tool electrode and the workpiece when brought to a position in close proximity to the workpiece;
a position detecting element for detecting a current position of the tool electrode in relation to the workpiece;
an operation circuit for calculating a next position to which the workpiece should be moved based on data regarding the current position of the tool electrode in relation to the workpiece obtained from the position detecting element, and predetermined machining data that are registered beforehand; and
a drive control unit for controlling movement of the X-direction moving stage and the Y-direction moving stage based on operation results of the operation circuit, wherein
the workpiece is automatically and continuously moved to a next position in the X and Y directions corresponding to the current position of the tool electrode in accordance with a machining shape.

2. The electric discharge machining apparatus according to claim 1 further comprising:
a discharge detecting element which detects occurrence of electric discharge between the tool electrode and the workpiece and outputs a discharge detection signal, wherein
the position detecting element starts detecting the current position of the tool electrode relative to the workpiece from a time when the discharge detection signal is input to the position detecting element, and outputs detected positional data to the operation circuit, whereupon the operation circuit starts calculation.

3. An electric discharge machining apparatus comprising:
a table for holding thereon a workpiece within dielectric;
a tool electrode for bringing about electric discharge between the tool electrode and the workpiece when brought to a position in close proximity to the workpiece;
an electrode drive mechanism for forwarding the tool electrode toward the workpiece;
a control unit for effecting control of the electric discharge between the tool electrode and the workpiece, and for controlling the electrode drive mechanism, wherein the control unit comprises:
a discharge circuit for supplying current for discharge by discharging electric charges charged at a capacitor by a power source device through a resistor;
a current detecting element for detecting a discharge current and outputting a discharge current detection signal; and
a discharge control circuit which detects occurrence of abnormal discharge based on a predetermined condition in which the discharge current detection signal is input, and shuts off supply of power from the power source device.

4. The electric discharge machining apparatus according to claim 3 wherein the discharge control circuit comprises a first switching element intervening a power supply circuit from the power source device to the capacitor, and a first operation control member which starts counting time from a time when the discharge current detection signal is input, and, when the discharge current detection signal is continuously input for a first predetermined period of time, turns off the first switching element for a second predetermined period of time.

5. The electric discharge machining apparatus according to claim 4 wherein the first operation control member turns the first switching element on and off in a predetermined cycle from the time when the discharge current detection signal is input.

6. The electric discharge machining apparatus according to claim 3 wherein the discharge control circuit comprises a switching element intervening the discharge circuit for the capacitor, and a operation control member which starts counting time from a time when the discharge current detection signal in input, and, when a predetermined period of time, corresponding to a predetermined pulse width of the discharge current has passed, turns off the switching element for a predetermined period of time corresponding to a predetermined pulse separation of the discharge current.

7. The electric discharge machining apparatus according to claim 6 wherein the operation control member turns the switching element on and off in a predetermined cycle from the time when the discharge current detection signal is input.

8. The electric discharge machining apparatus of claim 3, wherein a machining operation is carried out until the discharge control circuit detects abnormal discharge.

9. The electric discharge machining apparatus of claim 3, wherein the electric discharge of a machining operation is continuously supplied until abnormal discharge is detected.

10. An electric discharge machining apparatus comprising:

a table for holding thereon a workpiece;

a nozzle for continuously supplying a flow of dielectric toward the workpiece;

a moving stage on which the table is held and which is movable in a first vertical direction and a second direction that are orthogonal to each other within a plane;

a tool electrode arranged to be displaceable in a third direction that is orthogonal to both of the first vertical and second directions for performing electric discharge between the tool electrode and the workpiece when brought to a position in close proximity to the workpiece;

a position detecting element for detecting a current position of the tool electrode in relation to the workpiece;

an operation circuit for calculating a next position to which the workpiece should be moved based on data regarding the current position of the tool electrode in relation to the workpiece obtained from the position detecting element, and predetermined machining data that are registered beforehand; and a drive control unit for controlling movement of the moving stage based on operation results of the operation circuit, wherein the workpiece is automatically and continuously moved to a next position in the first vertical and second directions corresponding to the current position of the tool electrode in accordance with a machining shape.

11. An electric discharge machining method comprising:

positioning a workpiece held on a table such as to be movable in X and Y directions orthogonal to each other within a plane relative to a tool electrode that is arranged displaceable in a direction orthogonal to both of the X and Y directions;

detecting a current position of the tool electrode relative to the workpiece;

calculating a next position to which the workpiece should be moved based on detection results of the current position of the tool electrode and machining data that are registered beforehand; and moving the workpiece to the obtained next position, whereby the workpiece is automatically and continuously moved to successive positions corresponding to the current position of the tool electrode in accordance with a desired shape to be machined.

* * * * *